(12) United States Patent
Becker

(10) Patent No.: US 6,434,882 B1
(45) Date of Patent: Aug. 20, 2002

(54) CONTAINERIZED, MULTI-SEASON RAISED-BED GARDEN KIT

(75) Inventor: Robert J. Becker, Richfield, OH (US)

(73) Assignee: Pharmtec Corporation, Richfield, OH (US)

( * ) Notice: Subject to any disclaimer, the term of this patent is extended or adjusted under 35 U.S.C. 154(b) by 40 days.

(21) Appl. No.: 09/687,434

(22) Filed: Oct. 13, 2000

Related U.S. Application Data

(60) Provisional application No. 60/159,170, filed on Oct. 13, 1999.

(51) Int. Cl.[7] ................................................ A01G 9/00
(52) U.S. Cl. ......................................................... 47/19.1
(58) Field of Search ............................... 47/17, 18, 19.1

(56) References Cited

U.S. PATENT DOCUMENTS

| | | | | |
|---|---|---|---|---|
| 4,091,584 A | * | 5/1978 | Brown | 135/127 |
| 4,429,489 A | * | 2/1984 | Fischer | 47/18 |
| 4,651,466 A | * | 3/1987 | Robinson | 47/19.1 |

* cited by examiner

Primary Examiner—Charles T. Jordan
Assistant Examiner—Francis T. Palo
(74) Attorney, Agent, or Firm—Renner, Otto, Boisselle & Sklar, LLP

(57) ABSTRACT

A raised-bed garden kit having a frame, dual-function brackets, arched supports, and changeable covers. The dual-function brackets secure the cover to the frame and allow the cover to hinge at either side.

16 Claims, 3 Drawing Sheets

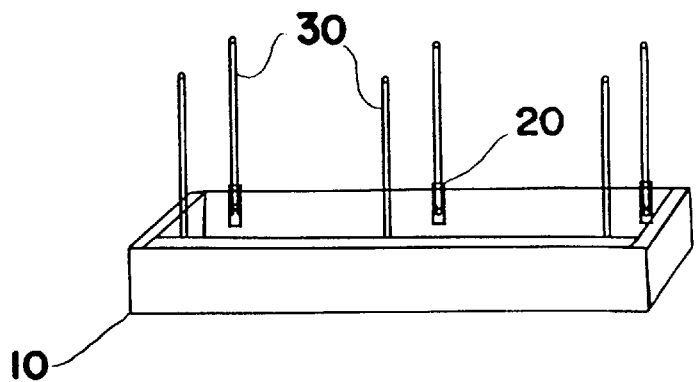
FIG. 5
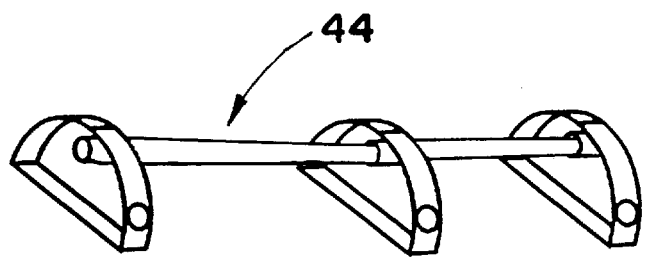
FIG. 6
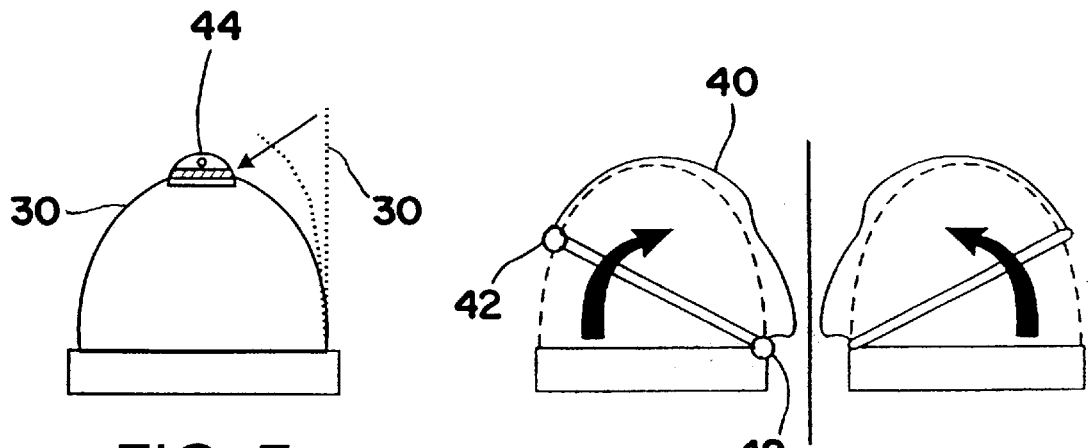
FIG. 7
FIG. 8

CONTAINERIZED, MULTI-SEASON RAISED-BED GARDEN KIT

This application claims the benefit of provisional application Ser. No. 60/159,170 filed Oct. 13, 1999.

FIELD OF INVENTION

This invention relates generally to a kit for containing a growing medium and more particularly to an assembly for creating a raised garden bed with a moveable cover.

BACKGROUND

Containerized gardening is an area of the home and garden market that is quickly gaining momentum. The market is being pushed by senior gardeners and time pressed, two-income couples living in apartments, townhouses and condos. This segment is looking for products formulated, sized and packaged for limited gardening activities.

The most logical choice is to create a self-contained garden. Traditional gardeners have built "raised-bed" gardens from dimensional lumber (2×6 or 2×12 treated lumber), railroad ties, etc. This form of "do-it-yourself" kit requires a blue print or plan, special tools such as saws, nails etc., lots of time, and woodworking aptitude that many individuals may not possess. In addition, treated lumber is not desirable for two primary reasons. First, the chemicals (arsenic, etc.) leach into the soil and, second, the constant contact with wet soil accelerates rotting of the lumber.

Several products have recently entered the market to make the DIY task easier. The products range from corner brackets into which customer supplied lumber can be placed to pre-cut wood and plastic lumber kits. Separately other vendors supply freestanding "covers" which can be placed over a traditional garden. None of the products introduced to date have an integrated cover system.

The concept is to provide a complete kit that is lightweight, easy to assemble (requires only a screwdriver), non-contaminating frame and about one-hour to complete. The additional benefit beyond the home made version above is a quick release, hinged cover The covers supplied are the most common used by growers: greenhouse "plastic" film, insect/shade netting, and "bird netting" (netting with one-inch openings).

The containerized garden kit is specially formulated to meet the needs of the rapidly growing market segment. This multi-season raised bed kit enables home gardeners to maximize the productivity of their plants with a variety of covers. Various sizes of the product allow the gardener to choose the best fit (planting area verses space required) for their limited space gardening needs The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed. It will be appreciated that the scope of the invention is to be determined by the claims and the equivalents thereof.

BRIEF DESCRIPTION OF DRAWINGS

In the annexed drawings:

FIG. 5 is a partially assembled invention;

FIG. 6 is a view of the center ridge;

FIG. 7 is a view of the invention with the center ridge installed; and

FIG. 8 illustrates the cover in a variety of positions.

DETAILED DESCRIPTION OF THE INVENTION

Figure 1:
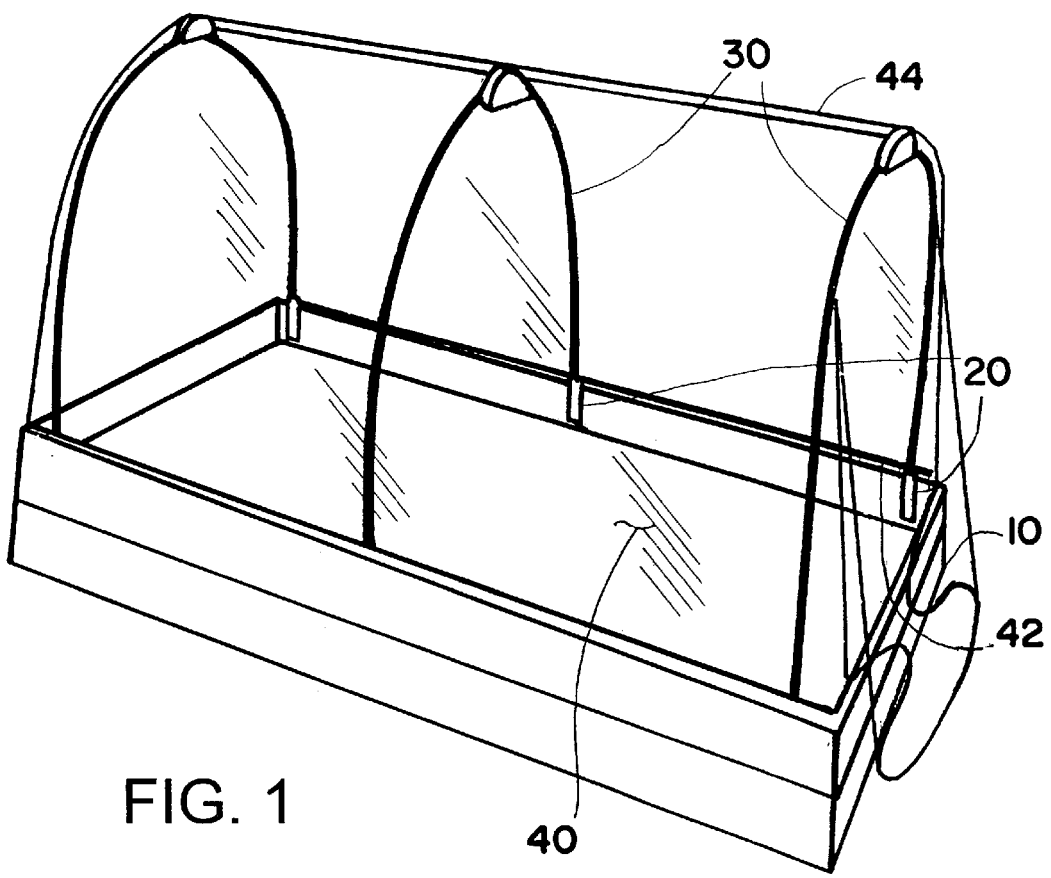
FIG. 1 is an isometric view of the invention.

The product kit has two separate, fully functional assemblies: the frame and the cover kit. The assemblies may be used together or separately. There are four main components that work together to form this growing system (FIG. 1): the frame 10, unique dual functionality brackets 20, arched supports 30, and changeable covers 40.

Figure 2:
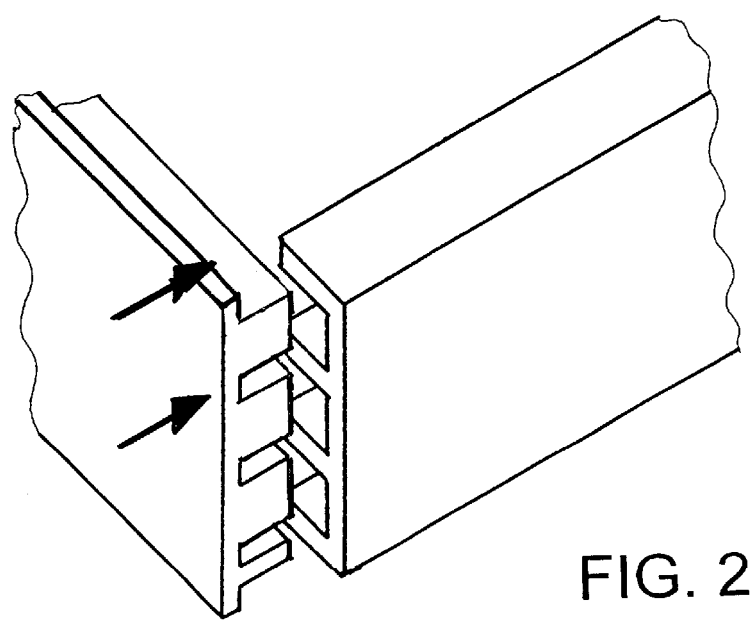
FIG. 2 is a view of a frame corner in accordance with one embodiment of the invention.

The frame is manufactured from a plastic material that withstands the agricultural chemicals, fertilizers, organic solvents and outdoor environment. The unique portions of the frame are the self-locking corners (FIG. 2). This feature is accomplished at the time of manufacture, by cutting a profile into the frame ends, and a mating profile cut into the frame side pieces. The net result is a slip-together frame that creates a strong corner from a hollow (2 web) extrusion.

Figure 3:
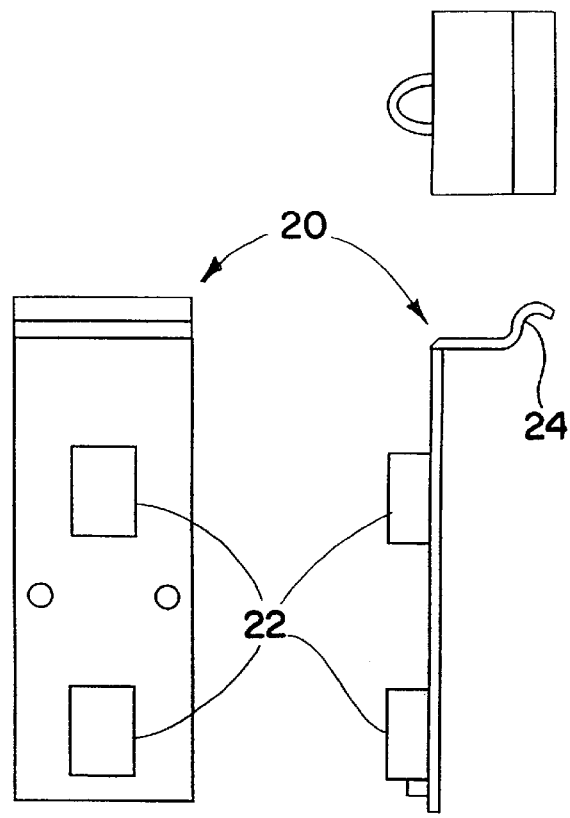
FIG. 3 represents orthogonal views of a mounting bracket for securing an arch support.
Figure 4:
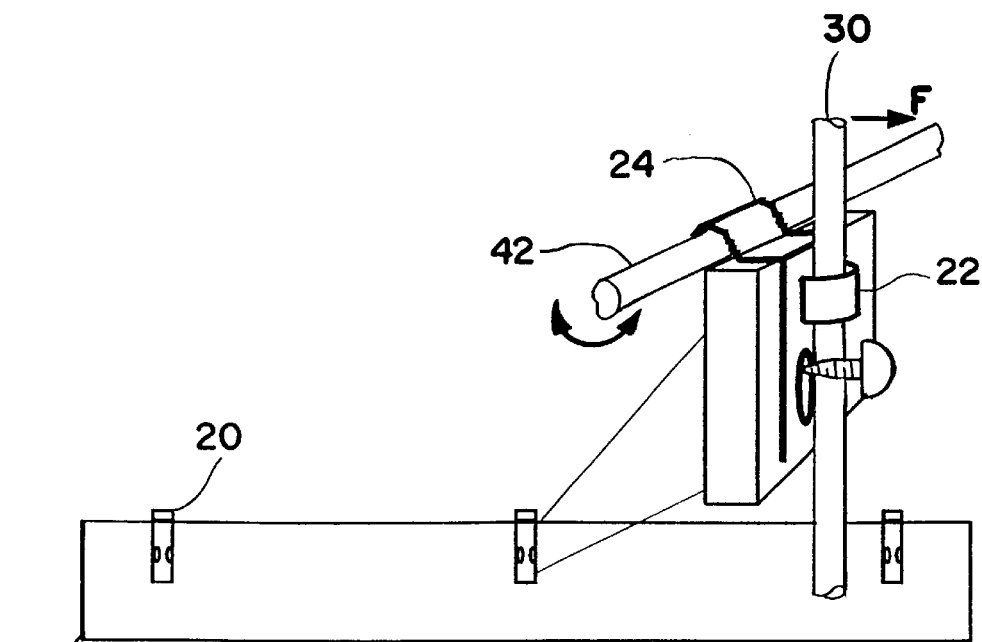
FIG. 4 is a view of hinge for allowing the cover to hinge.

The brackets 20 (FIG. 3) are mounted on the above-assembled frame 10 with screws (FIG. 4). They serve as a mount 22 for the arch supports, hinge 24 for the cover, and as a latch 24 to secure the cover to the frame The brackets combine with the tension provided by the arched supports to further hold the "slip-fit" frame corners in place and to create a "spring action" to secure the cover. This "spring action" is a flexing of the bracket, which creates a large opening of the latch section for inserting or removing the cover 42. The user can insert the cover into the latch section of the bracket by simply pushing the cover into the latch (FIG. 4) or open the latch by pressing inward (F) on the arch support 30 (FIG. 4). The removal of the cover can be accomplished by either pulling the cover out of the latch or again pressing inward on the arch support to release the latch.

The design of the bracket's latch also incorporates a hinge function (FIGS. 4 and 8). When the cover is latched on one side of the frame and released on the other side, the released side can be lifted because the latched side allows the cover to rotate (R) in place, creating a hinge.

The design of the arched supports creates a unique geometry that "holds" the cover in the open position. When opening and positioning the cover up to a certain point the cover will stay in that position (FIG. 8). Above a certain position the geometry causes the cover to "snap" to a full-open position.

The other function of the arched supports is to maximize the internal growing area. This is accomplished by a rapid rise in inside height compared to the distance across the garden bed.

A center "ridge" 44 (FIG. 6) is connected across the top of the arched supports 30 to minimize sagging of the covers and to provide a mounting structure for accessories. The accessories range from internal lattices (for vining plants, vegetables, etc.), grow lights, heaters, and sprinkler systems to sensors of various functionality.

The cover assembly consists of a frame, material securing clips, and a cover material. This configuration enable various cover materials (greenhouse film, shade netting, insect netting, bird netting, user supplied materials) to be quickly, securely, and easily installed or removed.

The preferred method of frame design is to use a round fiberglass rod 42. This choice has many advantages such as durability, flexibility, and ease of securing the cover with clips. Additionally, the round shape enables the frame to rotate in the bracket's latch portion to act as a low friction hinge. By using "L" shaped connectors to join the rods at the corners, the frame can be disassembled and the rod weaved through the large openings in the netting, eliminating the need for the use of clips.

What is claimed is:

1. A raised-bed containerized gardening assembly, comprising:
    a cover assembly;
    a number of arch supports; and
    a frame assembly including a number of frame members and a number of mounting brackets wherein each of the mounting brackets includes a mount for the arch supports and a latch to secure the cover.

2. The raised-bed containerized gardening assembly of claim 1 wherein the number of frame members have slip-fit corners and the number of arch supports provide tension to hold the slip-fit corners in a fixed relationship to one another.

3. The raised-bed containerized gardening assembly of claim 1 wherein the number of mounting brackets and the number of frame members flex to create a large opening at the latch to engage and secure the cover assembly.

4. The raised-bed containerized gardening assembly of claim 1 wherein each mount includes two openings and each latch includes a curved lip.

5. The raised-bed containerized gardening assembly of claim 4 wherein the two openings are arranged to receive a vertical cylindrical rod and the curved lip is configured to secure a horizontal cylindrical rod.

6. The raised-bed containerized gardening assembly of claim 1 wherein the cover assembly includes a frame and a cover.

7. The raised-bed containerized gardening assembly of claim 6 wherein the frame comprises a fiberglass rod.

8. The raised-bed containerized gardening assembly of claim 7 wherein the frame and the latch cooperate to form a hinge.

9. The raised-bed containerized gardening assembly of claim 1 wherein each mounting bracket is attached to a frame member and each arch support engages the mount such that the arch support urges the mounting bracket to flex.

10. A raised-bed containerized gardening assembly, comprising:
    a cover assembly including a frame and a cover;
    a number of arch supports;
    a center ridge; and
    a frame assembly including a number of frame members and a number of mounting brackets wherein each of the mounting brackets includes a mount for each arch support and a latch to secure the cover.

11. The raised-bed containerized gardening assembly of claim 10 wherein the each arch support is designed such that the cover may be positioned to be held in a partially open position.

12. The raised-bed containerized gardening assembly of claim 11 wherein the number of frame members have profiles at their respective ends to create slip-fit corners when assembled into the frame assembly.

13. The raised-bed containerized gardening assembly of claim 12 wherein the number of arch supports engage the number of mounting brackets so as to transfer tension to the frame members and maintain the positional relationship of the slip-fit corners.

14. The raised-bed containerized gardening assembly of claim 10 wherein each mount includes two coaxial openings for securing an arch support vertically and each latch includes a retaining edge to secure the frame horizontally.

15. The raised-bed containerized gardening assembly of claim 14 wherein the retaining edge and the frame cooperate as a hinge to allow the cover to pivot.

16. The raised-bed containerized gardening assembly of claim 10 wherein the number of arch supports engage the number of mounting brackets and urge an opening flexure of the latch to receive the cover.

\* \* \* \* \*